United States Patent Office 2,894,104
Patented July 7, 1959

2,894,104

TEMPERATURE RESPONSIVE CONTROL

Victor Weber, Greensburg, Pa., assignor to Robertshaw-Fulton Controls Company, Greensburg, Pa., a corporation of Delaware Application July 12, 1955, Serial No. 521,549

7 Claims. (Cl. 219—20)

This invention relates to an improved control mechanism for controlling the heat output of a heating element, more particularly, a surface heating element of an electric range.

It is a principal object of this invention to automatically regulate the heat output of the surface heating element to maintain a cooking vessel, supported thereon, at a desired temperature.

Many foods require rapid initial heating to bring the food to a predetermined temperature and thereafter require reduced amount of heat input to maintain such predetermined temperature. It is an object of this invention to effect such a cooking operation by permitting the heating element to operate at full energy input until the temperature of the food to be cooked reaches a predetermined value, and then continuing the cooking operation with energy input to only one section of the heating element.

Another object of this invention is to effect such a cooking operation by permitting one section of the heating element to operate at a high energy input and another section of the heating element to operate at a low energy input until the temperature of the food to be cooked reaches a predetermined value, and then continuing the cooking operation with energy input to only the lower energy section.

Another object of this invention is to effect a cooking operation by permitting the heating element to operate at full energy input until the temperature of the food to be cooked reaches a predetermined value and then continuing the cooking operation with energy supplied to only one section of the heating element, the energy input to which is increased at high control temperatures.

In one preferred embodiment of the invention, thermally responsive means is provided for operating a pair of switches which respectively control energization of two resistance sections of an electric heating element. Circuit means connect the switches and resistance sections whereby energy input to one resistance section of the heating element is of maximum value while the energy input to the other section is proportionately lower. Both switches are permitted to remain closed until the temperature of the cooking vessel heated by the heating element reaches a predetermined value whereupon one switch opens to discontinue the supply of energy to the high input section and continue the cooking operation with the low input section. Third switch means are provided which increase the supply of electric energy to the low input section when the control temperature of the device is increased.

Other objects and advantages will become apparent from the following description taken in connection with the accompanying drawings wherein.

Figure 1:
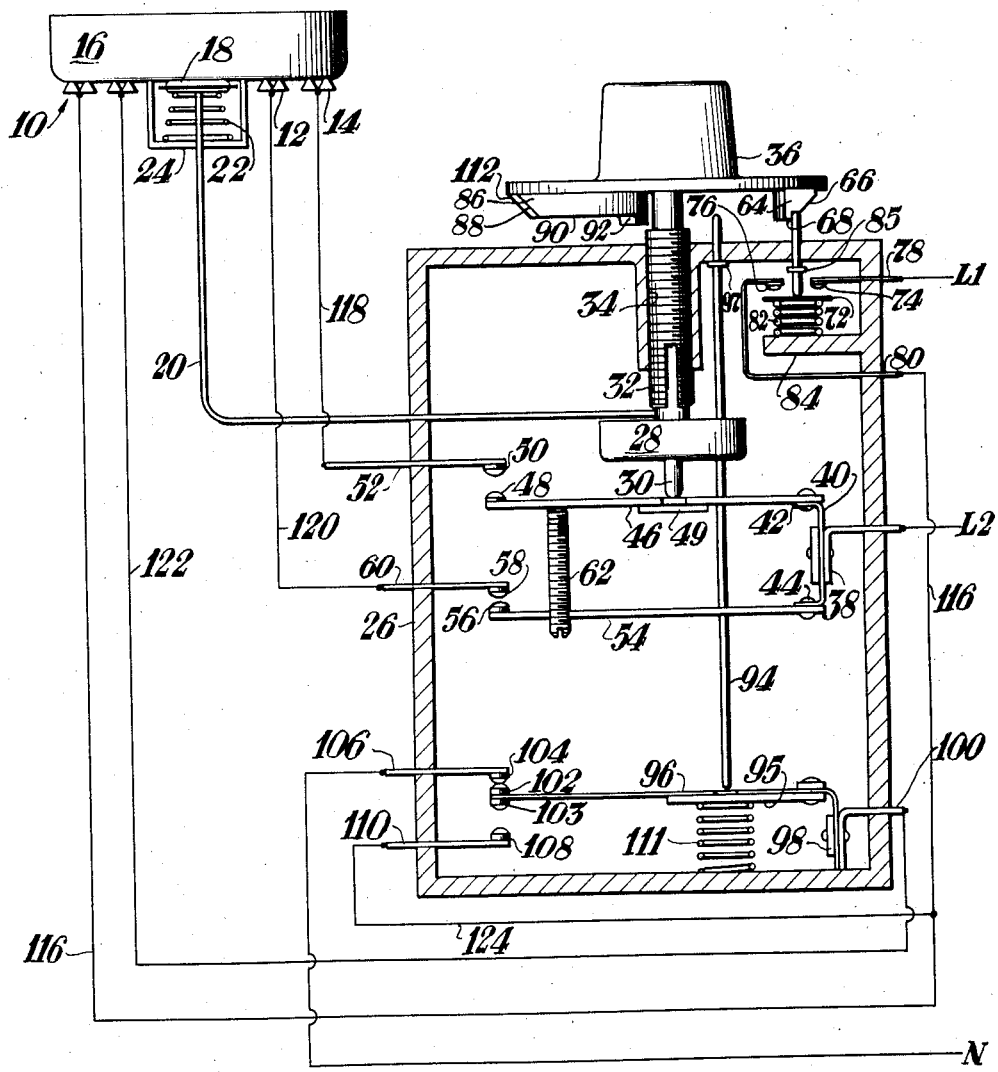
Fig. 1 is a schematic showing of a temperature responsive control embodying this invention.
Figure 2:
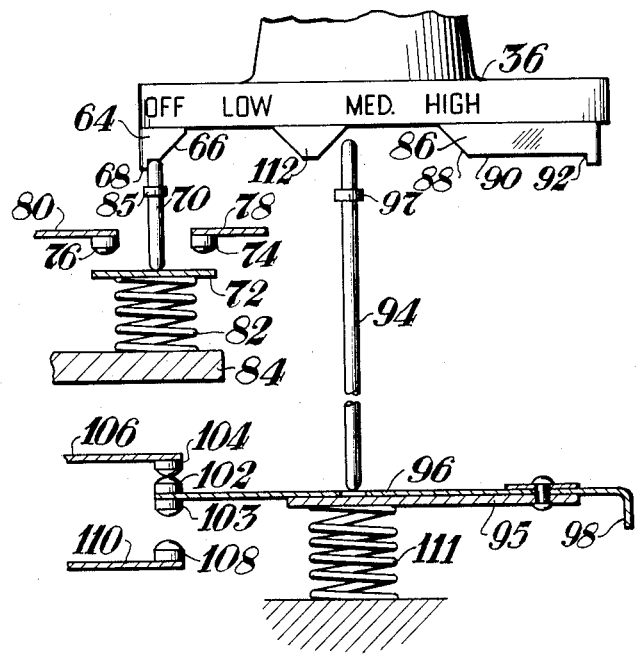
Fig. 2 is a schematic development of the control dial of Fig. 1 with the switches operated thereby shown in schematic relation thereto.

Referring more particularly to the embodiment shown in Figs. 1 and 2, an annular surface heating element 10 is adapted to be supported on the top plate of an electric range in a manner well known in the art. The heating element 10 comprises two resistance sections 12 and 14 which are adapted to be energized separately for a purpose which will later be described. The heating element 10 is adapted to support a cooking vessel 16 thereon and is provided with a temperature sensing bulb 18 which is located centrally thereof.

The bulb 18 takes the form of a flat hollow container which communicates with a capillary tube 20 connected thereto and is biased toward the cooking vessel 16 by a spring 22 seated on a suitable stirrup 24. The particular structure of the bulb 18 and mounting therefor may be of any suitable type and further description is deemed unnecessary.

The capillary tube 20 extends through the wall of a casing 26 and communicates with an expansible power element 28 which may consist of a pair of flexible diaphragms welded together at their peripheries and carrying a thrust button 30 on one side thereof. The other side of the power element 28 abuts a stud 32 which is preferably provided with left-hand threads and threaded through a suitable aperture 34 formed in another wall of the casing 26.

The opposite end of the stud 32 projects out of the casing 26 and carries a manually operable knob or dial 36 which may be manipulated to rotate the stud 32 and effect axial adjustment of the power element 28 relative to the casing 26. The assembly of the bulb 18, capillary tube 20, and expansible power element 28 is filled with a suitable thermal fluid which will expand upon increase in temperature sensed by the bulb 18 to effect expansion of the power element 28. The device thus far described is well known in the art and further description is deemed unnecessary.

A generally L-shaped terminal bracket 38 has one end projecting from the casing 26 for connection with a power source as will later be described and the other end thereof extending within the casing 26 to provide a support for a generally U-shaped flexible bracket 40. The bracket 40 is provided with legs 42 and 44 and has a medial portion thereof attached to the bracket 38. One leg 42 of the bracket 40 is fixed to one end of a switch 46 which underlies the bellows member 28 and carries on the free end thereof a contact 48 and has fixed on the medial portion thereof, an insulating pad 49 which is adapted to be engaged by the button 30. The contact 48 is engageable with a fixed contact 50 carried by one end of a terminal 52 which projects through the wall of the casing 26 for connection in a circuit later to be described. The contact 48 is biased toward engagement with the contact 50 by the inherent bias of the bracket 40 which tends to rotate the arm 48 clockwise into engagement with the movable end 30 of the power element 28 as shown.

Another switch arm 54 has one end attached to the leg 44 of the bracket 40 and extends substantially parallel to the switch arm 46. The free end of the arm 54 carries a contact 56 which is engageable with a fixed contact 58 carried by one end of a terminal 60, the other end of which projects through the wall of the casing 26 for connection to an electric circuit later to be described. The contact 56 is biased toward engagement with contact 58 by the inherent bias of the bracket 40 which tends to rotate the switch arm 54 clockwise.

Abutment means is provided for transmitting movement from the switch arm 46 to the switch arm 54 for a purpose which will more fully appear hereinafter. This means takes the form of an adjusting screw 62 threaded through the switch arm 54 and extending toward the switch arm 46 to be engageable thereby.

The dial 36 is provided on the underside thereof with an abutment 64 which provides a cam surface 66 and a stop 68. A pin 70 is here shown as having one end thereof in engagement with the cam surface 66 and stop 68 and having the other end thereof extending into the casing 26 to engage a contact bridge 72. The contact bridge 72 is biased toward engagement with two contacts 74 and 76, respectively carried on the ends of two terminal brackets 78, 80, by a spring 82 which is mounted in compression between the contact bridge 72 and a support 84 defined by the casing 26.

The terminals 78, 80 are connected in an electric circuit later to be described and cooperate with the contact bridge 72 to control energization of the circuit. In the position shown, the pin 70 holds the contact bridge out of engagement with the contact 74 and 76, thus, establishing an off position of the dial 36. However should the dial 36 be rotated clockwise, the pin 70 will ride down the cam surface 66 and release the contact bridge 72. The abutment 68 prohibits clockwise rotation of the dial 36 past the off position. An abutment 85 on the pin 70 limits upward movement of the pin 70 and prevents passage thereof to the exterior of the casing 10.

A second abutment 86 is positioned on the underside of the dial 36 and provides a cam surface comprising a generally inclined surface 88 extending up to a substantially level surface 90 which is provided at the end thereof with a stop 92. A pin 94 is slidably positioned within a suitable bore in the casing 26 to have one end projecting from the casing 26 to be engageable by the abutment 86 and the other end thereof extending interiorly of the casing 26 to be engageable with an insulating pad 95 fixed to a medial portion of a switch arm 96. An abutment 97 formed on the pin limits upward movement thereof.

One end of the switch arm 96 defines an upturned portion 98 which is attached to a generally L-shaped terminal bracket 100. One end of the bracket 100 extends exteriorly of the casing 26 to be connected to the electric circuit later to be described. The other free end of the switch arm 96 carries a pair of oppositely disposed contacts 102, 103. One contact 102 is engageable with a fixed contact 104 carried on the end of a terminal 106 while the other contact 103 is engageable with the fixed contact 108 carried by a terminal 110. Both terminals 106 and 110 project exteriorly of the casing 26 to be connected in an electric circuit later to be described. A spring 111 is mounted in compression between the switch arm 96 and the bottom wall of the casing 26 and is operative to bias the contact 102 toward engagement with the contact 104 as shown.

The abutment 86 is positioned on the dial 36 so that upon clockwise rotation of the dial 36 to increase the temperature setting thereof, the pin 94 will ride up the inclined surface 88 and onto the level surface 90. Extreme clockwise rotation of the dial moves the stop 92 into engagement with the pin 94 and prevents further rotation of the dial 36. Thus, the stops 68 and 92 define a predetermined range of movement for the dial 36 and define the "off" and "high" positions of the dial 36.

The height of the surface 90 is sufficient to displace the switch arm 96 sufficiently to cause opening of the contacts 102 and 104 and engagement of contact 103 with contact 108. This movement is said to occur at approximately the mid-point of the range of movement of the dial 36 by positioning the inclined surface 88 whereby the pin 94 will be engaged thereby at approximately the midpoint of the range of movement of the dial 36.

As will later be seen arcing may occur when the contacts 102 and 104 are opened and contacts 103 and 108 closed. To prevent this, a third abutment 112 having inclined surfaces is positioned on the underside of the dial 36 to be engageable with the pin 70. Abutment 112 is positioned to engage the pin 70 and move the same axially thereby to momentarily open the switch 72, 74, 76 during movement of contact 102 out of engagement with contact 104 and engagement of contact 103 with contact 108. The abutments 86 and 112 are cooperably positioned to cause the above-described movements of pins 70 and 94 simultaneously during movement of the dial 36.

In operation the terminal 78 is connected to line wire L1 of a suitable three-wire power source and terminal 38 is connected to the other line wire L2 of the source. One end of a lead wire 116 is connected to the terminal 80 and the other end is connected to one side of the heating element 14. A lead wire 118 completes the circuit to the heating element 14 having one end connected thereto and the other end connected to terminal 52. A lead wire 120 connects one side of the heating element 12 to terminal 60 and lead wire 122 connects to other side of the heating element 12 to terminal 100. To complete the circuit, a lead wire 124 connects the terminal 110 to lead wire 116 and terminal 106 is connected to the neutral wire N of the source.

As shown, the apparatus is in the off position with no electrical energy being supplied to the heating elements 12 and 14 since the contact bridge 72 is out of engagement with the contacts 74 and 76. Assume now the dial 36 is rotated clockwise as viewed in Fig. 1 to a low temperature setting. Such rotation of the dial 36 will move the abutment 64 out of engagement with pin 70 and permit the contact bridge 72 to engage contacts 74 and 76 under the bias of the spring 82. The temperature setting movement of the dial 36 will also serve to screw the stud 32 out of the casing 26 and move the power element 28 upward, thereby permitting the movable contacts 56 and 48 to move into engagement with the fixed contacts 50, 58 respectively.

The apparatus is thus conditioned to supply a steady flow of electrical energy to the heating elements 12 and 14 through a circuit which may be traced as follows: from line wire L1, through contacts 74 and 76, wire 116, heating element 14, wire 118 contacts 50 and 48, and switch arm 46 to line wire L1 and from line wire L2 through switch arm 54, contacts 56 and 58, wire 120, heating element 12, wire 122, switch arm 96, contacts 102 and 104 to the neutral wire N of the source. From the described circuit it will be apparent that the voltage for energizing the heating element 14 will be substantially double the voltage for energizing the heating element 12 since element 14 is effectively connected across line wire L1 and L2, while element 12 is effectively connected across line wire L2 and neutral wire N.

When power is so supplied to the heating elements 12 and 14, heat will be generated thereby to raise the temperature of the cooking vessel 16 and the food contained therein. As the temperature of the cooking vessel 16 rises, the temperature of the bulb 18 will increase to cause expansion of the power element 28. Expansion of the power element 28 will move the thrust button 30 into engagement with the switch arm 46 to swing the switch arm 46 in a counterclockwise direction against the bias of the bracket 40 to move the contact 48 out of engagement with the contact 50.

Opening of the contacts 48 and 50 will open the circuit which energizes the heating element 14 and heating of the vessel 16 will continue with only heating element 12 energized. Heat supplied to the cooking vessel 16 at this reduced rate continues to raise the temperature of the food therein, bringing it gradually to the temperature set by the dial 36.

It will be apparent that, since the thermal fluid within the bulb 18 is separated from the vessel 12 by layers of metal and air, the temperature thereof will necessarily lag the temperature of the vessel. However, when heat is being supplied to the vessel at a relatively low rate, the degree at which the temperature of the thermal fluid lags the temperature of the food will be substantially less than when heat is being supplied to the vessel 16 at a relatively high rate. Accordingly, a reduction of the rate of heat input to the vessel 16 as the same approaches the desired temperature, will reduce the possibility of overshooting and consequently burning of the contents of the vessel 16.

As the temperature of the vessel 16 rises as a result of the energy input to the heating element 12 under the control of the contacts 56, and 58, the temperature rises as sensed by the bulb 18 so that the power element 28 continues to expand. The continued expansion of the power element 28 moves the switch arm 46 into engagement with screw 62 carried on the switch arm 54. Further expansion of the power element 28 imparts movement to the screw 62 to move the switch arm 54 against the bias of the bracket 40 and open contacts 56 and 58.

Opening of the contacts 56 and 58 will break the energizing circuit for the heating element 12 and completely terminate the supply of heat to the vessel 16.

As the temperature of the vessel 16, as sensed by the bulb 18, drops, the power element 28 will contract to permit the switch arms 46, 54 to flex upward under the bias of the bracket 40. This movement of the switch arms 46, 54 will move the contact 56 into engagement with the contact 58 to once again complete the energizing circuit for heating element 12 and restore the low rate of heat supply to the vessel 16. Usually, restoration of the reduced rate of heat input will serve to restore the desired temperature to the vessel 16 to again cause expansion of the power element 28 and opening of the contacts 56, 58. However, in the event that the reduced heat input is not sufficient to restore the desired temperature, the power element may contract sufficiently to close the contacts 48, 50 thereby completing the circuit which energizes the heater 14 to provide a greater supply of electric energy to the vessel 16.

It will be apparent from the foregoing that the apparatus shown in Fig. 1 is operative to bring the temperature of the cooking vessel rapidly up to a temperature approaching desired control temperature by supplying electric energy continuously to a pair of heating elements 12 and 14 and thereafter effecting a gradual temperature rise of the cooking vessel 16 to the selected cooking temperature at a reduced rate input by supplying electric energy only to the heating element 12. The temperature at which the power supply to the heating element 14 is discontinued is accurately determined with respect to the desired cooking temperature of the vessel 16, as selected by the setting of dial 36, by means of the screw 62 carried on the switch arm 54. The screw 62 may be adjusted relatively to the switch arm 54 to vary the differential between the temperatures at which the switch arms 46, 54 will open their respective contacts. Thus, the screw 62 effectively adjusts the temperature span in which the heating element 12 and switch contacts 58, 60 will control the cooking operation.

Assume now that the dial 36 is rotated clockwise as viewed in Fig. 1 to the high temperature setting. As the dial passes the mid-point of its predetermined range of movement, abutment 112 will engage the pin 70 and cause reciprocating movement of pin 70 to momentarily move the contact bridge 72 out of engagement with contacts 74, 76. Simultaneously, pin 94 is engaged by abutment 90 and rides up the surface 88 onto the flat surface 90 to move contact 103 into engagement with contact 108, in which position contact 102 remains during further clockwise movement of the dial 36. Movement of the dial 36 to a higher temperature setting also serves to adjust the stud 32 relatively to the casing 26 and in a direction to move the power element upwardly, thereby permitting the movable contacts 48, 56 to move into engagement with the fixed contacts 50, 58 respectively.

As a result of the above described switching operation, the heating element 12 is now connected to be energized in a circuit which may be traced as follows: from line wire L1 through contacts 74, 76, wire 116, wire 124, contacts 103, 108, switch arm 96, wire 122, element 12, wire 120, contacts 56, 58, switch arm 54 and to line wire L2. Thus, both heating elements 12, 14 are now effectively connected across the line wires L1 and L2 and energized by substantially equal voltages.

The operation of the device at the higher temperature setting is substantially the same as described above for a low temperature setting with the exception that the element 12 is now supplied with electric energy at a higher rate. Both elements 12 and 14 are energized until a predetermined temperature of the vessel 16 is reached. Contacts 48, 50 will then open and further heating of the vessel 16 will continue at a reduced rate by heating element 12 only, bringing the contents of the vessel 16 to the temperature set by the dial 36 gradually.

At higher temperature ranges, the heat input required to effect an increase in the temperature of the vessel 16 is substantially greater, thus, the device provides excellent control of the temperature at both the lower temperature ranges where low heat input is required and at the higher temperature ranges where high heat input is required.

It is also to be noted that opening the contacts 76, 74 simultaneously with movement of contact 102 out of engagement with contact 104 and engagement of contact 103 with contact 108 prevents arcing which would normally result from switching from the neutral wire N to the line wire L1.

Figure 3:
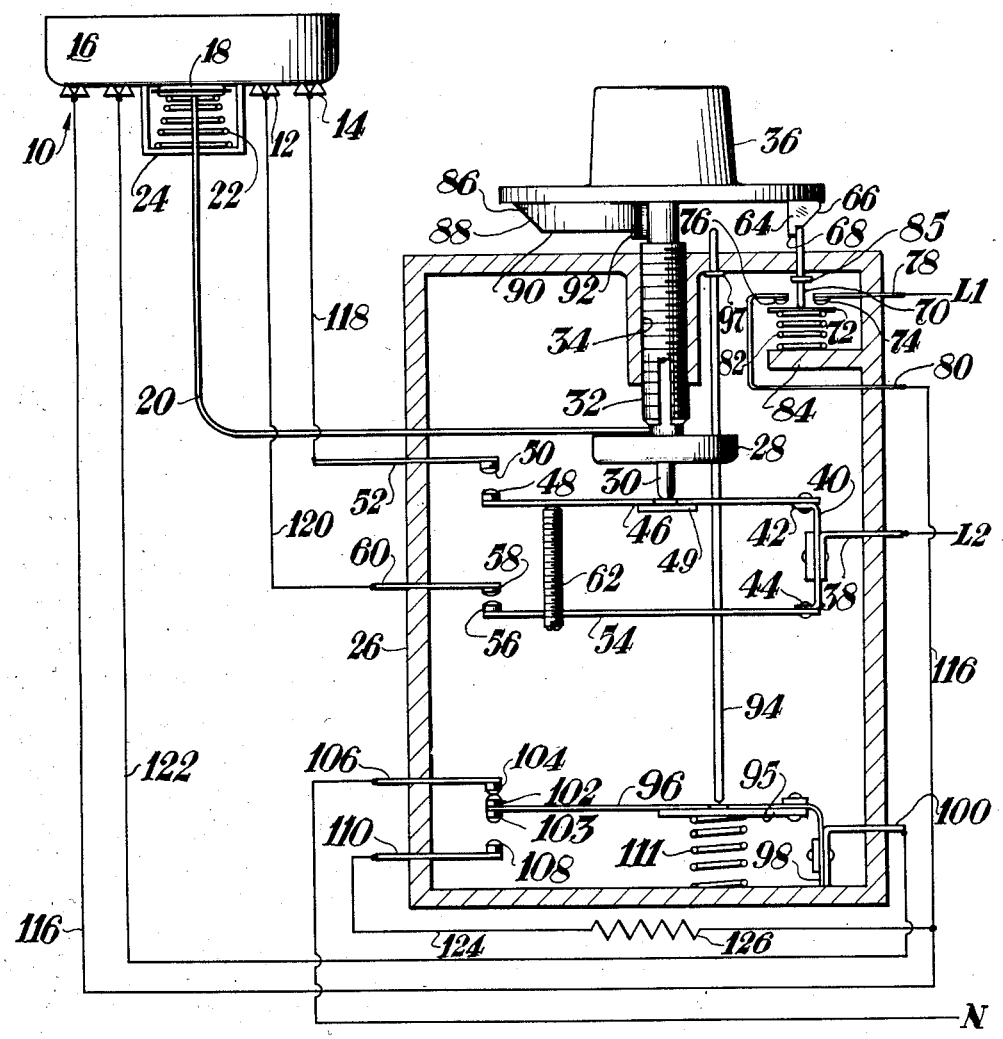
Fig. 3 is a schematic showing of another embodiment of the temperature responsive control embodying this invention.
Figure 4:
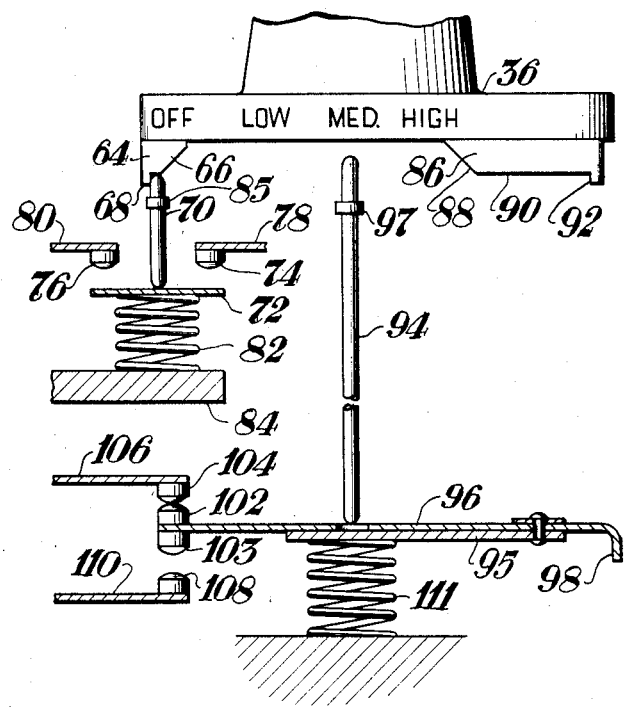
Fig. 4 is a schematic development of the control dial of Fig. 3 with the switches operated thereby shown in schematic relation thereto.

The embodiment of the invention shown in Figs. 3 and 4 is similar to the embodiment shown in Figs. 1 and 2 but differs in that abutment 112 has been eliminated. More particularly, a resistance 126 is connected in the lead wire 124 to limit current flow through contacts 102, 108 in the event that at the moment of switching an arc may be carried over. The value of the resistor is such that a very small percentage of the power input to the system is used thereby. Use of the resistor 126 eliminates need for opening contacts 74, 76 during closing of contacts 103, 108, thus eliminating need for abutment 112.

Operation of the embodiment shown in Figs. 3 and 4 is substantially the same as operation of that shown in Figs. 1, and 2 differing only in that contacts 74, 76 are not opened during movement of contact 103 into engagement with contact 108.

While only two embodiments of the invention have been herein shown and described, it will be obvious to those skilled in the art that the invention may be variously embodied and that changes may be made in the construction and arrangement of parts without departing from the scope of the invention as defined in the appended claims.

It is claimed and desired to secure by Letters Patent:

1. In an electric heater assembly having a plurality of surface heating elements for heating a cooking vessel and a source of electric energy, the combination comprising circuit means for connecting said heating elements to a source of electric energy and including a plurality of switches connected in series with the heating elements and the source for controlling energization of said elements respectively, means responsive to the temperature of the vessel for sequentially opening said switches when a predetermined temperature is attained to supply electric energy at a predetermined rate under the control of one of said switches, means operable over a first range of movement and a second range of movement for adjusting said predetermined temperature at which said temperature responsive means will respond, and control switch means connected in the series circuit of said one switch and operatively connected to said adjustment means to be movable from one position to another during movement of said adjustment means from said first range of movement to said second range of movement and operative to supply electric energy to said one switch and the heating element controlled thereby at a predetermined rate in said one position and at a different rate in said other position.

2. In an electric heater assembly having a pair of surface heating elements for heating a cooking vessel and a source of electric energy, the combination comprising circuit means including a pair of switches connected in series with the heating elements for controlling energization of the heating elements respectively, means responsive to a temperature condition of the vessel for opening one of said switches at a first predetermined temperature and the other of said switches at a second predetermined temperature of the vessel, manually operable means movable through a first predetemrined range of movement and a second predetermined range of movement for adjusting said predetermined temperatures at which said temperature responsive means will respond, control switch means movable between controlling positions and connected in series with one of said pair of switches and said source for connecting said one switch and the heating element controlled thereby to a predetermined amount of electric energy when moved to one controlling position and to a reduced amount of electric energy when moved to a second controlling position, means operatively connected to said manually operable means for maintaining said control switch means in said one controlling position during movement of said manually operable means through said first range of movement and in said second controlling position during movement of said manually operable means through said second range of movement.

3. In an electric heater assembly having a plurality of surface heating elements for heating a cooking vessel and a source of electric energy, the combination comprising circuit means including first switch means connected in series with the heating elements and the source for controlling energization of the heating elements, second switch means for connecting said circuit means to the source of electric energy, third switch means connected in series with said first switch means and operative in one position to supply electric energy to said first switch means at a first predetermined rate and in another position at a second predetermined rate, means responsive to a temperature condition of the vessel for operating the first said switch means, means including a rotatable member movable through a first predetermined range of movement and a second predetermined range of movement for varying the temperature at which said temperature responsive means will respond, and means operated by said rotatable member during rotation thereof from said first predetermined range of movement to said second predetermined range of movement for simultaneously opening said second switch means and moving said third switch means from said one position to said other position.

4. In an electric heater assembly including a pair of surface heating elements for heating a cooking vessel and a three-wire source of electrical energy having a neutral wire and two supply wires, the combination comprising circuit means for connecting the heating elements to the source, a pair of switches in said circuit means connected in series relation with the heating elements for controlling the energization of said heating elements respectively, thermally responsive means operatively connected to said switches for moving said switches between open and closed positions, manually operable means including a rotatable member operable over a first predetermined range of movement and a second predetermined range of movement for adjusting operation of said thermally responsive means, a third switch in said circuit means connected in series with one of the heating elements and the sources and movable between first and second positions, said third switch being operative to connect said one heating element across one supply wire and the neutral wire of the source when in said first position and connect said one heating element across the two supply wires of the source when in said second position, and means operatively connected to said rotatable member for moving said third switch from said first to said second position as said member is rotated from said first predetermined range of movement into said second predetermined range of movement.

5. An electric heater assembly as claimed in claim 4 wherein the last said means comprises a cam surface on said rotatable member.

6. An electric heater assembly as claimed in claim 4 wherein said circuit means includes a resistor in series with said third switch.

7. In an electric heater assembly having a surface heater for supporting a cooking vessel thereon and a pair of heating elements, the combination comprising circuit means for connecting said heating element to a three-wire source of electric energy having a neutral and two supply wires, a pair of switches associated with said circuit means for controlling energization of said heating elements respectively, thermally responsive means operatively connected to said switches for moving said switches between open and closed positions, manually operable means including a rotatable member operable over a first predetermined range of movement and a second predetermined range of movement for adjusting operation of said thermally responsive means, a third switch associated with said circuit means and movable between first and second positions, said third switch being operative to connect one of said heating elements across one supply wire and the neutral wire of the source when in said first position and connect said one heating element across the two supply wires of the source when in said second position, means associated with said rotatable member for moving said third switch from said first to said second position as said member is rotated from said first predetermined range of movement into said second predetermined range of movement, and a fourth switch operatively connected to said rotatable member to be moved to an open position to de-energize said circuit means when said third switch is moved from said first to said second position.

References Cited in the file of this patent

UNITED STATES PATENTS

| 2,388,702 | Pearce | Nov. 13, 1945 |
| 2,403,824 | Newell | July 9, 1946 |
| 2,410,013 | Clark | Oct. 29, 1946 |
| 2,541,314 | Weber et al. | Feb. 13, 1951 |
| 2,675,455 | Richardson | Apr. 13, 1954 |
| 2,747,073 | Welch et al. | May 22, 1956 |
| 2,767,293 | Jordan | Oct. 16, 1956 |
| 2,790,057 | Schauer | Apr. 23, 1957 |
| 2,806,119 | Williams | Sept. 10, 1957 |
| 2,811,627 | Fry | Oct. 29, 1957 |
| 2,815,428 | Pearce | Dec. 3, 1957 |
| 2,816,999 | Fry | Dec. 17, 1957 |